US012281487B2

(12) United States Patent
Elyahu et al.

(10) Patent No.: US 12,281,487 B2
(45) Date of Patent: Apr. 22, 2025

(54) DEPLOYABLE AND RETRACTABLE COVER

(71) Applicants: TOP GREENHOUSES LTD., Rishon Lezion (IL); TILN PROJECTS LTD., Moshav Merhavia (IL)

(72) Inventors: Asaf Elyahu, Ramat HaSharon (IL); Alon Nahir, Moshav Merchavia (IL); Amiram Regev, Alon HaGalil (IL)

(73) Assignees: Top Greenhouses LTD., Rishon Lezion (IL); Tiln Projects LTD, Moshav Merhavia (IL)

( * ) Notice: Subject to any disclaimer, the term of this patent is extended or adjusted under 35 U.S.C. 154(b) by 623 days.

(21) Appl. No.: 17/617,794

(22) PCT Filed: Jun. 18, 2020

(86) PCT No.: PCT/IL2020/050682
§ 371 (c)(1),
(2) Date: Dec. 9, 2021

(87) PCT Pub. No.: WO2020/255139
PCT Pub. Date: Dec. 24, 2020

(65) Prior Publication Data
US 2022/0235573 A1 Jul. 28, 2022

Related U.S. Application Data

(60) Provisional application No. 62/863,296, filed on Jun. 19, 2019.

(51) Int. Cl.
*E04H 15/54* (2006.01)
*A01G 9/16* (2006.01)
(Continued)

(52) U.S. Cl.
CPC ............... *E04H 15/54* (2013.01); *A01G 9/16* (2013.01); *A01G 13/21* (2025.01); *E04F 10/02* (2013.01); *A01G 13/372* (2025.01)

(58) Field of Classification Search
CPC ...... A01G 9/16; A01G 13/02; A01G 13/0206; E06B 2009/2405; E06B 2009/2423;
(Continued)

(56) References Cited

U.S. PATENT DOCUMENTS 593,654 A * 11/1897 Headley ............. A01G 13/0206
47/22.1
1,106,624 A * 8/1914 Cadwallader ...... A01G 13/0206
160/264
(Continued)

FOREIGN PATENT DOCUMENTS

EP 0878125 A1 * 11/1998 ............. A01G 13/02
EP 1438891 A1 * 7/2004 ............. A01G 9/225
(Continued)

*Primary Examiner* — Johnnie A. Shablack
(74) *Attorney, Agent, or Firm* — William H. Dippert; Laurence A. Greenberg; Werner H. Stemer

(57) ABSTRACT

A cover system comprises at least one cover sheet having four edges and a plurality of flexible rafters. Each of the rafters is slidably connected to at least one of two opposite edges of the four edges, and at least one roller is provided on at least one of two other opposite edges of the four edges, wherein the roller is configured to rotate. The cover sheet is configured to wrap around the roller and be released from the roller, depending on a direction of rotation of the roller.

21 Claims, 6 Drawing Sheets

(51) Int. Cl.
*A01G 13/21* (2025.01)
*E04F 10/02* (2006.01)
*A01G 13/37* (2025.01)

(58) Field of Classification Search
CPC ....... E06B 2009/2441; E06B 2009/405; A01H 2013/0218; E04H 15/54; E04F 10/02; E04F 10/0607
See application file for complete search history.

(56) References Cited

U.S. PATENT DOCUMENTS

| | | | | |
|---|---|---|---|---|
| 2,568,048 | A * | 9/1951 | Arnold | E04F 10/02 135/904 |
| 2,832,362 | A * | 4/1958 | Critoph | E04F 10/0607 52/63 |
| 3,051,232 | A * | 8/1962 | Lamb | E04F 10/0607 160/368.1 |
| 4,678,019 | A * | 7/1987 | Esposito | A01G 9/227 254/389 |
| 4,744,403 | A * | 5/1988 | Hausmann | E04F 10/0607 160/310 |
| 4,827,957 | A * | 5/1989 | Chang | A01G 9/1407 135/120.2 |
| 4,836,264 | A * | 6/1989 | Machin | E06B 9/17 160/265 |
| 4,841,688 | A * | 6/1989 | Rinaldi | E04H 15/322 52/63 |
| 5,174,352 | A * | 12/1992 | Murray | E04F 10/0614 160/67 |
| 5,186,231 | A * | 2/1993 | Lewis | E04F 10/0607 160/264 |
| 5,307,855 | A * | 5/1994 | Martensson, IV | E04F 10/0607 160/310 |
| 5,311,699 | A * | 5/1994 | Huffman | A01G 9/22 52/63 |
| 5,408,770 | A * | 4/1995 | Suzuki | E04G 21/3204 160/368.1 |
| 5,479,979 | A * | 1/1996 | Hayashiguchi | E06B 9/60 160/265 |
| 5,502,930 | A * | 4/1996 | Burkette | G09F 15/0068 52/282.1 |
| 5,802,762 | A * | 9/1998 | Stonecypher | A01G 9/16 47/17 |
| 6,006,811 | A * | 12/1999 | Brutsaert | E04F 10/0603 135/141 |
| 8,051,866 | B2 * | 11/2011 | Cutler | E04F 10/0607 135/117 |
| 9,163,401 | B2 * | 10/2015 | Vollebregt | A01G 9/242 |
| 9,784,010 | B2 * | 10/2017 | Tejada | E04H 15/64 |
| 9,938,723 | B2 * | 4/2018 | Shargani | E04H 15/54 |
| 10,026,343 | B2 * | 7/2018 | Kim | G09F 9/302 |
| 10,617,067 | B2 * | 4/2020 | Van Deursen | A01G 9/242 |
| 10,849,281 | B2 * | 12/2020 | Toye | A01G 13/0206 |
| 2004/0074154 | A1 * | 4/2004 | Mangeard | A01G 9/222 52/3 |
| 2005/0051283 | A1 * | 3/2005 | Chatellard | E06B 9/40 160/265 |
| 2007/0017646 | A1 * | 1/2007 | Zhao | E04F 10/0655 160/239 |
| 2009/0307991 | A1 * | 12/2009 | Renaers | E04F 10/0681 52/63 |
| 2010/0243176 | A1 * | 9/2010 | Cutler | E04F 10/0607 160/45 |
| 2010/0252212 | A1 * | 10/2010 | Daniel | A63C 19/12 160/382 |
| 2012/0180961 | A1 * | 7/2012 | Lin | B60J 7/0015 160/370.22 |
| 2012/0227213 | A1 * | 9/2012 | Karsten | E04H 4/101 16/87.2 |
| 2017/0321481 | A1 * | 11/2017 | Ashkanmehr | E06B 9/70 |
| 2020/0115939 | A1 * | 4/2020 | Uchida | E05D 1/02 |
| 2022/0235573 | A1 * | 7/2022 | Elyahu | A01G 9/16 |
| 2022/0287250 | A1 * | 9/2022 | Shay | E04F 10/0607 |
| 2024/0044135 | A1 * | 2/2024 | Vollebregt | E04B 7/166 |

FOREIGN PATENT DOCUMENTS

| | | | | |
|---|---|---|---|---|
| EP | 3162603 | A1 * | 5/2017 | ............ B60J 7/0015 |
| GB | 2251777 | A * | 7/1992 | ........ A01G 13/0206 |
| WO | 2019009031 | A1 | 1/2019 | |

* cited by examiner

DEPLOYABLE AND RETRACTABLE COVER

CROSS-REFERENCE TO RELATED PATENT APPLICATIONS

This patent application is a U.S. National Phase filing under 35 U.S.C. § 371 of PCT Patent Application No. PCT/IL2020/050682, filed Jun. 18, 2020, which is based upon and claims the priority of U.S. Provisional Patent Application Ser. No. 62/863,296, filed Jun. 19, 2019, the entire contents each of which is incorporated herein by reference in its entirety.

FIELD

The present subject matter relates to covers, like pavilions or sheds. More particularly, the present subject matter relates to deployable and retractable covers.

BACKGROUND

Covers, like pavilions, or sheds, made of flexible sheets, like canvas sheets, are occasionally used to cover open spaces, for example playgrounds festival areas, and other areas of outdoor activity, in order to protect the open spaces from direct sunlight, or rain. Covers are also used to protect the content of structures, like greenhouses, from direct sunlight. Assembly and disassembly of such covers is complicated and cumbersome.

In some occasions, there is a desire to temporarily retract the cover. For example, when there is a need to temporarily allow exposure of plants in a greenhouse to sunlight, and then deploy the cover again over the greenhouse in order to prevent further exposure of the plants to excess sunlight. Such practice of retraction and deployment of the currently available covers is also cumbersome and complicated.

SUMMARY

Unless otherwise defined, all technical and scientific terms used herein have the same meaning as commonly understood by one of ordinary skill in the art to which this subject matter belongs. Although methods and materials similar or equivalent to those described herein can be used in the practice or testing of the present subject matter, suitable methods and materials are described below. In case of conflict, the patent specification, including definitions, will control. In addition, the materials, methods, and examples are illustrative only and not intended to be limiting.

According to one aspect of the present subject matter, there is provided a cover system comprising:
  at least one cover sheet having four edges;
  a plurality of flexible rafters, each of the rafters is slidably connected to at least one of two opposite edges of the four edges; and
  at least one roller provided on at least one of two other opposite edges of the four edges, wherein the roller is configured to rotate, and the cover sheet is configured to wrap around the roller and be released from the roller, depending on a direction of rotation of the roller.

According to one embodiment, the cover sheet has a square shape.

According to another embodiment, each of the rafters is slidably connected to at least one of two opposite longitudinal edges, and wherein the at least one roller is provided on at least one of two transverse edges.

According to yet another embodiment, the cover system further comprises at least one support configured to support each of the rafters.

According to still another embodiment, the support is in a form of a pole that is configured to hold the rafter above a surface of an open space.

According to a further embodiment, the support is a part of a structure that is covered by the support system.

According to yet a further embodiment, the structure is a greenhouse.

According to still a further embodiment, the rafter comprises:
  a tube;
  a cable threaded within the tube and extending out of the tube; and
  one, or two rails flexibly attached to the tube,
    wherein the rail is configured to hold a cover sheet, and allow sliding of the cover sheet along the length of the rail.

According to an additional embodiment, the rafter further comprising one, or two connectors, each connector is configured to connect the rail to the tube.

According to yet an additional embodiment, the connector is narrow.

According to still another embodiment, the connector allows bending of the rail relative to the tube.

According to another embodiment, the rail comprising a hollow along an entire length of the rail, and a slot along an entire length of the rail, wherein the slot is positioned distally from the tube to which the rail is attached.

According to yet another embodiment, the rail has a round profile, and with the slot has a substantially C-shaped profile.

According to still another embodiment, the cover sheet is flexible.

According to a further embodiment, a plurality of sliders is attached to at least one of two opposite edges of the four edges of the cover sheet, wherein the slider is configured to be threaded in the hollow of the rail, and slide along the rail, wherein the cover sheet passes through the slot.

According to yet a further embodiment, the plurality of sliders is attached to a longitudinal edge of a strip, wherein an opposite longitudinal side of the strip is attached to the at least one of two opposite edges of the four edges of the cover sheet.

According to still a further embodiment, a friction between a surface of the slider and an inner surface of the rail, facing the hollow, is minimal, thus allowing smooth sliding of the slider along the rail.

According to an additional embodiment, there is a gap between the sliders that are attached to at least one of two opposite edges of the four edges of the cover sheet.

According to yet an additional embodiment, a size of the slider is larger than a size of the slot, wherein the slider is confined within the hollow, and is configured to slide inside the hollow without being able to pass through the slot and disconnect from the rail.

According to still an additional embodiment, the cable is configured to attach to at least two supports and be stretched between the at least two supports.

According to another embodiment, the rail is configured to withstand a transverse force applied on the sliders that are within the hollow, and not bend in a manner that widens the slot and allows the sliders to be pulled out of the rail through the slot.

According yet another embodiment, the rail is configured to withstand a transverse force and prevent exit of the slider through the slot up to a certain threshold level, and when the level of the transverse force is higher than the threshold level, the rail is configured to become flexible and allow widening of the slot in a manner that allows exit of the slider through the slot.

According to still another embodiment, the cable is made of a single strand.

According to a further embodiment, the cable is made of a plurality of interwoven strands.

According to yet a further embodiment, the cover sheet comprises a plurality of sub-cover sheets that are attached one to the other along a length of the cover sheet.

According to still a further embodiment, the sub-cover sheets are different in their transparency.

According to an additional embodiment, a first roller is attached to one side of the cover sheet, and a second roller is attached to an opposite side of the cover sheet, wherein simultaneous rolling of the first roller and the second roller, in the same direction and velocity, causes changing of the sub-cover sheet that is practically used for covering.

According to yet an additional embodiment, the roller is manually operated.

According to still an additional embodiment, the roller is operated by a rotor.

BRIEF DESCRIPTION OF THE DRAWINGS

Embodiments are herein described, by way of example only, with reference to the accompanying drawings. With specific reference now to the drawings in detail, it is stressed that the particulars shown are by way of example and for purposes of illustrative discussion of the preferred embodiments, and are presented in the cause of providing what is believed to be the most useful and readily understood description of the principles and conceptual aspects of the embodiments. In this regard, no attempt is made to show structural details in more detail than is necessary for a fundamental understanding, the description taken with the drawings making apparent to those skilled in the art how several forms may be embodied in practice.

In the drawings.

DESCRIPTION OF THE PREFERRED EMBODIMENTS

Figure 1:
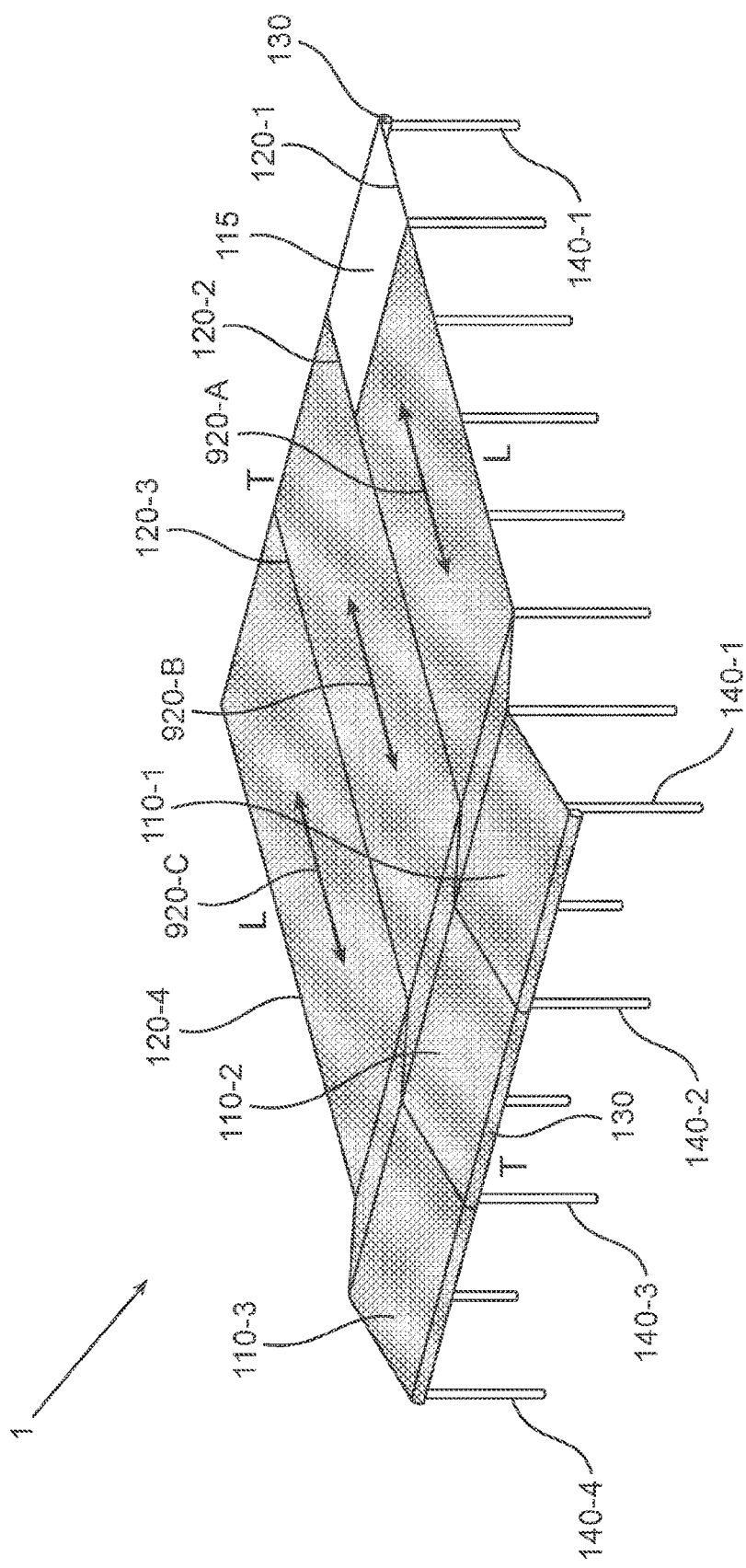
FIG. 1 schematically illustrates, according to an exemplary embodiment, a cover system.

Before explaining at least one embodiment in detail, it is to be understood that the subject matter is not limited in its application to the details of construction and the arrangement of the components set forth in the following description or illustrated in the drawings. The subject matter is capable of other embodiments or of being practiced or carried out in various ways. Also, it is to be understood that the phraseology and terminology employed herein is for the purpose of description and should not be regarded as limiting. In discussion of the various figures described herein below, like numbers refer to like parts. The drawings are generally not to scale.

For clarity, non-essential elements were omitted from some of the drawings.

The present subject matter provides a cover system, optionally comprises several covers, that allows easy and rapid deployment and retraction of at least one cover. The cover is deployed over an open space, which optionally can contain plants, trees, flowers, vegetables, or animals, for example in greenhouses, as well as children in playgrounds and army or industry equipment such as in hangars.

The cover system comprises: at least one cover sheet having four edges; a plurality of flexible rafters, each of the rafters is slidably connected to at least one of two opposite edges of the four edges; and at least one roller provided on at least one of two other opposite edges of the four edges, wherein the roller is configured to rotate, and the cover sheet is configured to wrap around the roller and be released from the roller, depending on a direction of rotation of the roller. According to one embodiment, the cover sheet has a square shape. According to another embodiment, each of the rafters is slidably connected to at least one of two opposite longitudinal edges, and wherein the at least one roller is provided on at least one of two transverse edges.

Referring now to FIG. 1, schematically illustrating, according to an exemplary embodiment, a cover system. According to one embodiment, the cover system 1 comprises: at least one cover sheet 110-X (X refers to a number of an item in a plurality of items that are similar or identical) having two opposite longitudinal sides L and two opposite transverse sides T; a plurality of rafters 120-X, wherein each longitudinal side L of the cover sheet 110-X is movably connected to a rafter 120-X; and at least one roller 130, wherein at least one of the transverse sides 110-T of a cover sheet 110-X is connected to the roller 130, and wherein the roller 130 is configured to rotate, and the cover sheet 110-X is configured to wrap around the roller 130 and be released from the roller 130, depending on the direction the roller 130 is rotated. The covers 110-X are configured to move according to the arrow 902-X.

Optionally or alternatively, the sheet can be moved and wrapped around an appropriate roller 130 that can be on either side of the cover 110-X or only on one side. In case there are two rollers 130 operated on both sides of the cover, the cover 110-X can be wrapped on each one according to the current needs. As an example, the cover 110-1 is shown in FIG. 1 in a state in which it is partially wrapped on the corresponding frontal roller 130 so that a portion of the surface is covered and a portion 115 is uncovered while the volume beneath this portion 115 is exposed to sunlight, rain or the like.

According to one embodiment, the cover system 1 further comprises at least one support 140-X configured to support each of the rafters 120-X. According to another embodiment, illustrated in FIG. 1, the support 140-X can be in a form of a pole that is configured to hold the rafters 120-X in a predetermined height above a surface of an open space, for example above a sand on the beach, above a grass loan, above a paved surface, above an orchard or crops, and the like. According to yet another embodiment, the support 140-X can be a part of a structure, for example a part of a roof of a greenhouse.

The ability and ease of the covers to deploy and retract is due to the structure of the rafters 120-X and its connection to the cover sheet 110-X.

Figure 2:
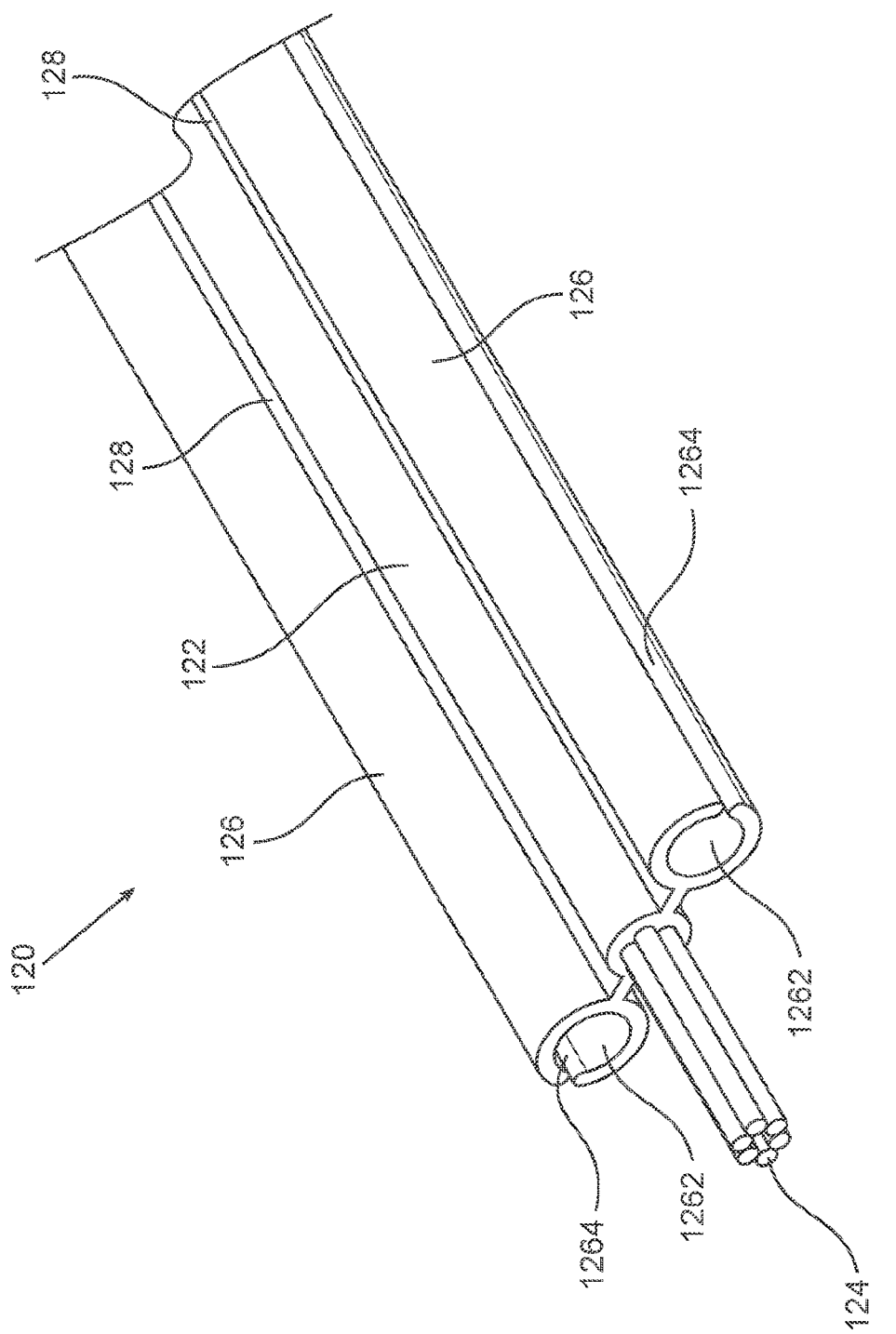
FIG. 2 schematically illustrates, according to an exemplary embodiment, a rafter of a cover system.

Referring now to FIG. 2, schematically illustrating, according to an exemplary embodiment, a rafter of the cover system. According to one embodiment, a rafter 120 comprises a tube 122, a cable 124 threaded within the tube 122 and extending out of the tube 122; and one, or two rails 126 flexibly attached to the tube 122, wherein the rail 126 is configured to hold a cover sheet and allow the cover sheet to slide along the length of the rail 126 according to embodiments that are described hereinafter. The exemplary rafter 120 illustrated in FIG. 2 comprises two rails 126 attached to opposite sides of the tube 122. However, the rafter 120 can comprise one rail 126 attached to the tube 122. The cable can be any type of cable that is configured to withstand relatively high strength. The cable can be entwined or unite.

According to one embodiment, the rafter 120 further comprises one, or two connectors 128, each connector 128 is configured to connect the rail 126 to the tube 122. As can be seen in FIG. 2, the connector 128 is attached to the rail 126 and the tube 122, and resides between the rail 126 and the tube 122. According to another embodiment, the connector 128 is narrow. According to yet another embodiment, the connector 128 allows bending of the rail 126 relative to the tube 122.

As illustrated in FIG. 2, the rail 126 comprises a hollow 1262 along the entire length of the rail 126, and a slot 1264 along the entire length of the rail 126. The slot 1264 of the rail 126 is positioned distally from the tube 122 to which the rail 126 is attached. Thus, when the rafter 120 comprises two rails 126 attached to the tube 122, the slots 1264 of the two rails 126 are directed opposite one to the other.

The rail 126 can have a profile in any shape that is suitable for allowing the cover sheet to slide along the length of the rail 126 according to embodiments that are described hereinafter. The exemplary rail 126 illustrated in FIG. 2 has a round profile, and with the slot 1264, it has substantially a C-shape profile. However, this shape of profile is only exemplary and should not be considered as limiting the scope of the present subject matter. For example, the rail can have a rectangular profile having a slot 1264, a triangular profile having a slot 1264, and the like.

According to one embodiment, the rafter 120 is flexible. In other words, the tube 122 is flexible, the cable 124 is flexible, and the rail 126 is flexible. According to another embodiment, the connector 128 is flexible as well. In this way, the rafter can be wind into a compact structure.

Figure 3:
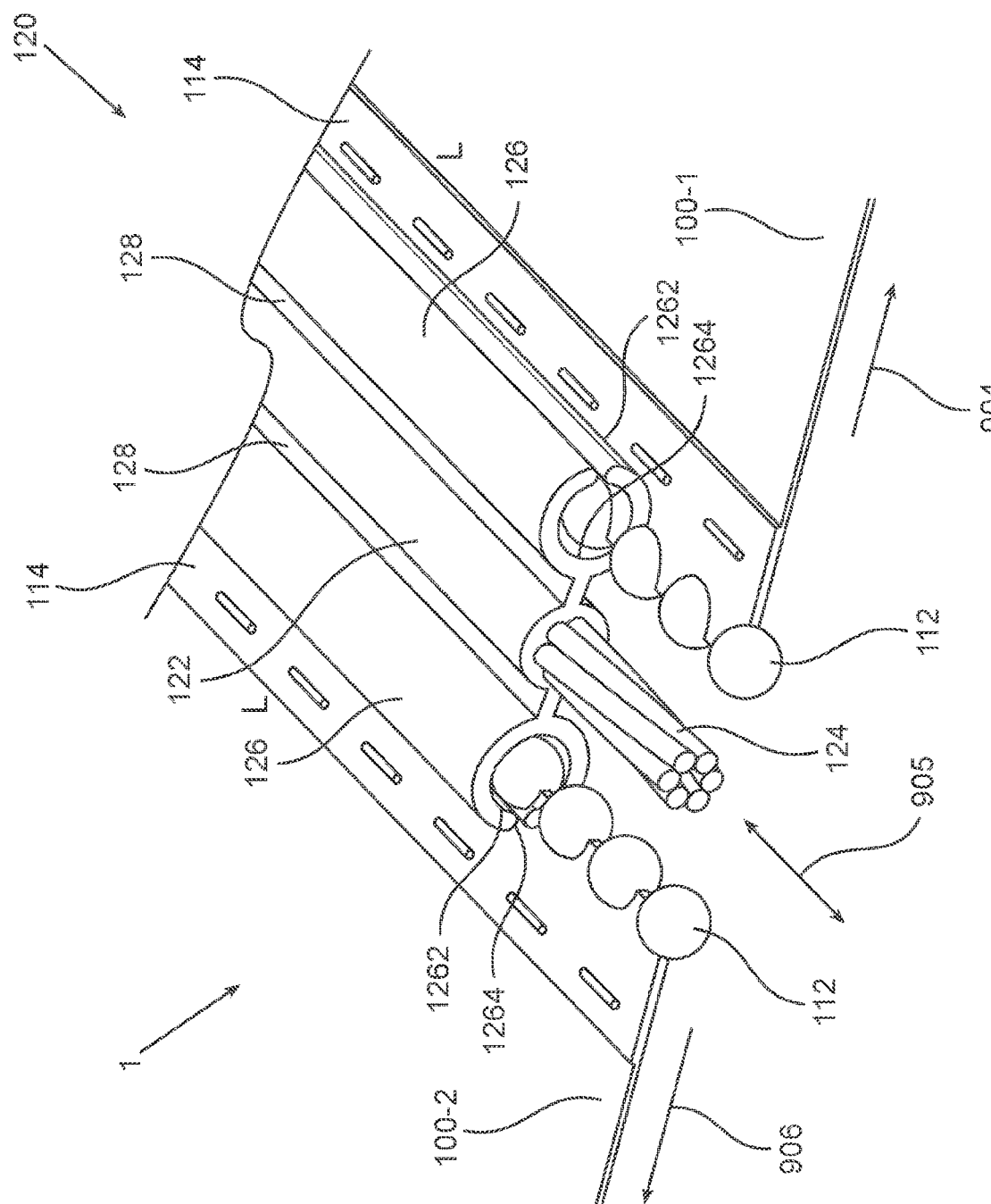
FIG. 3 schematically illustrates, according to an exemplary embodiment, cover sheets connected to a rafter.

Referring now to FIG. 3, schematically illustrating, according to an exemplary embodiment, cover sheets connected to a rafter. The rafter 120 is shown to connect to two cover sheets 110-1 and 110-2 on both sides, which is a portion of the system 1 as shown in FIG. 1, in an enlarged view. According to one embodiment, the cover sheet 110-X is flexible, and is made of a flexible material, like canvas, nylon, fabric, net, and the like. According to another embodiment, a plurality of sliders 112 is attached to a longitudinal edge L of the cover sheet 110-1 and 110-2. The sliders 112 are configured to be threaded in the hollow 1262 of the rail 126, and slide along the rail 126. Thus, the slot 1264 of the rail 126 allows connection of the sliders 112 to the cover sheets 110-1 and 110-2, when the cover sheets pass through the slot 1264.

According to the aforementioned embodiment, the plurality of sliders 112 is directly attached to the longitudinal edge L of the cover sheet 110. According to another embodiment, illustrated in FIG. 3, the plurality of sliders 112 is attached to a longitudinal edge of a strip 114, when an opposite longitudinal side of the strip 114 is attached to the longitudinal edge L of the cover sheet 110. According to still another embodiment, the strip 114 is adhered to the longitudinal edge L of the cover sheets.

As mentioned above, the plurality of sliders 112 is configured to be threaded in the hollow 1262 of the rail 126, and slide along the rail 126. According to one embodiment, the plurality of sliders 112 is configured to freely slide along the rail 126. According to another embodiment, a friction between a surface the slider 112 and an inner surface of the rail 126, facing the hollow 1262 is minimal, thus allowing smooth sliding of the slider 112 along the rail 112. Such minimal friction between the surface of the slider 112 and the inner surface of the rail 126 can be achieved by making the slider 112 of a material having a low friction coefficient, or coating the surface of the slider 112 with a material having a low friction coefficient, or making the rail 126 of a material having a low friction coefficient, or coating the inner surface of the rail 126, facing the hollow 1262, with a material having a low friction coefficient, or any combination thereof.

The attachment of the plurality of sliders 112 to the longitudinal edge L of the cover sheet 110-X, according to the aforementioned embodiments, retains the flexibility of the longitudinal edge L of the cover sheet 110-X. For example, when there is a gap between the sliders 112, it is possible to bring the sliders 112 close one to another, while somewhat folding the longitudinal edge L of the cover sheet 110-X in the gap between two adjacent sliders 112. This allows, for example, shortening of the length of the cover sheet 110-X to some extent. This embodiment is different, and advantageous, compared to prior art cover sheets. The edges, for example longitudinal edges, of prior art cover sheets are supported by rigid frames, or rigid beams, which render the edges of the prior art cover sheets rigidity.

According to one embodiment, the shape and size of the slider 112 corresponds to the shape and size of the hollow 1262 of the rail 126. For example, the rail 126 illustrated in FIG. 3 has a tube-like structure having a round profile. Accordingly, the slider 112 has a ball-like shape having a round profile and a size that fits the size of the hollow 1262 of the rail 126, in a manner that allows sliding of the slider 112 along the rail 126, as described above. However, the embodiment illustrated in FIG. 3, regarding the size and shape of the slider 112 should not be considered as limiting the scope of the present subject matter. The slider 112 can have any size and shape as long as it enables threading of the slider 112 into the hollow 1262 of the rail 126, and sliding of the slider 112 along the rail 126.

According to one embodiment, the rafter 120 is flexible. In other words, the tube 122 is flexible, the cable 124 is flexible, and the rail 126 is flexible. According to another embodiment, the connector 128 is flexible as well. In this way, the rafter can be wound into a compact structure.

As illustrated in FIG. 3, the cable 124 is prone to longitudinal forces, designated with double arrow 905. These longitudinal forces 905 are applied on the cable 124 when the cable 124 is stretched between two opposite supports 140 (as shown in FIG. 1). Thus, according to one embodiment, the cable 124 is configured to withstand longitudinal forces 905 applied to the cable 124. As further illustrated in FIG. 3, the cable 124 is prone to a first transverse force. An exemplary first transverse force is designated with a rightward arrow 904. The first transverse force 904 is a pulling force applied by a first cover 110-1 that is connected to the rafter 120 according to embodiments described above. Similarly, the cable 124 is prone to a second transverse force. An exemplary second transverse force is designated with a leftward arrow 906. The second transverse force 906 is also a pulling force applied by a second cover 110-2 that is connected to another side of the rafter 120 according to embodiments described above. It has to be mentioned that when only one cover sheet 110-X is connected to the rafter 120, then only one transverse force is applied on the cable 124. Thus, according to another embodiment, the cable 124 is configured to withstand a first transverse force 904, or a second transverse force 906, or both a first transverse force 904 and a second transverse force 906.

According to one embodiment, the rail 126 is configured to withstand a transverse force 904 or 906 applied by the cover sheet 110-X connected to the rail 126 through the sliders 112. The transverse forces 904 or 906 that is applied by the cover sheet 110-X tend to pull the sliders 112 out of the rail 126 through the slot 1264. Thus, according to a preferred embodiment, the rail 126 is configured to withstand the transverse forces 904 and 906 and does not bend in a manner that widens the slot 1264 and allows the sliders 126 to be pulled out of the rail 126 through the slot 1264, and thereby disconnect the cover sheet 110 from the rafter 120. According to another embodiment, the rail 126 is configured to withstand a transverse force 904 or 906 in a certain degree. Accordingly, a rail 126 can be made of materials and designed in a manner that allows the rail 126 to withstand a certain degree of transverse forces 904 and/or 906. Thus, different rails 126 can be designed to withstand different degrees of a transverse force 904 or 906.

According to one embodiment, the cable 124 is made of a single strand. According to another embodiment, the cable 124 is made of a plurality of interwoven strands.

Figure 4:
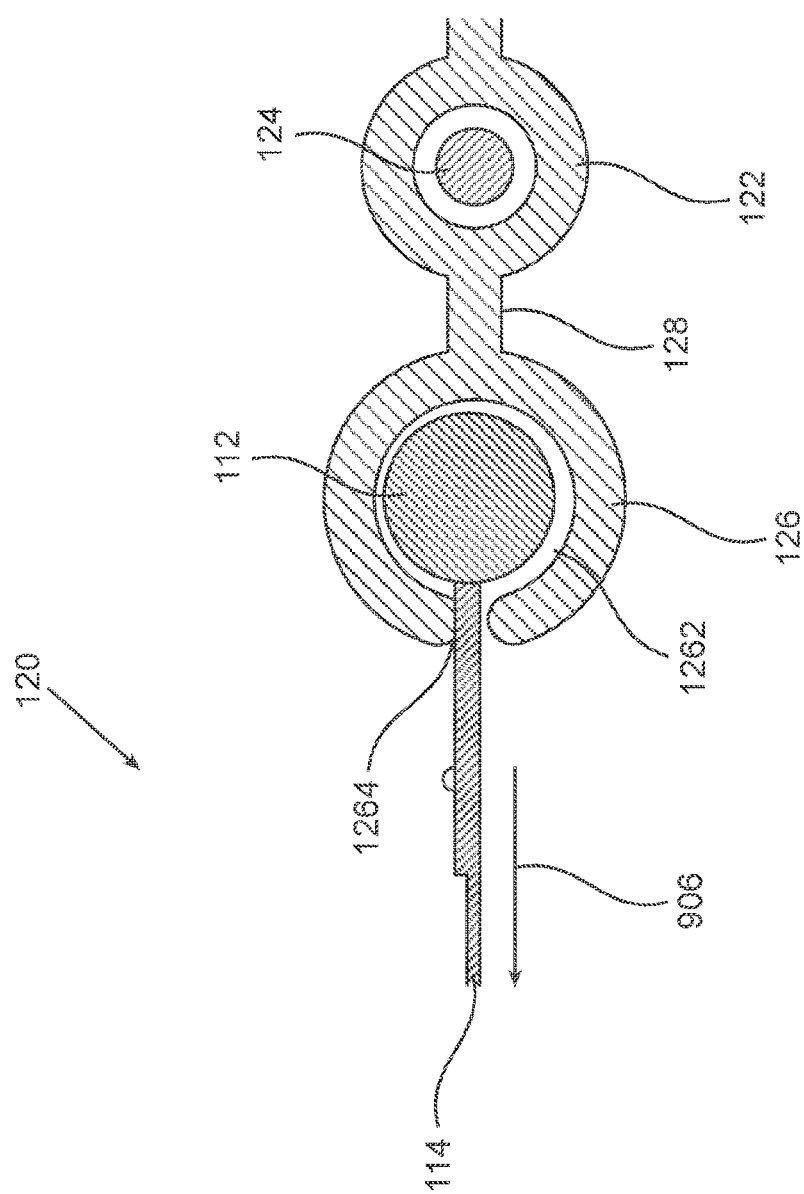
FIG. 4 schematically illustrates, according to an exemplary embodiment, a cross-sectional view of a rafter connected to a cover sheet.

Referring now to FIG. 4, schematically illustrating, according to an exemplary embodiment, a cross-sectional view of a rafter connected to a cover sheet. FIG. 4 illustrates an exemplary embodiment of the rafter 120 in which a tube 122 is connected to a rail 126 with a connector 128. Inside the tube 122 there is a cable 124. The rail 126 comprises a hollow 1262 and a slot 1264. Inside the hollow 1262 of the rail 126 there is a slider 112. Since the hollow 1262 is cylindrical, the slider 112 has a ball-like shape having a circular profile that corresponds to a circular profile of the hollow 1262 of the rail 126. All illustrated in FIG. 4 is a gap between the slider 112 and an inner surface of the rail 126. This gap allows the slider 112 to freely slide along the rail 126. Nevertheless, as described above there are additional embodiments in which the ability of the slider 112 to freely slide along the rail 126 is represented. In addition, since FIG. 4 illustrates a cross sectional view, only one of the plurality of sliders 112 that are illustrated in FIG. 3, is shown.

Another embodiment that is illustrated in FIG. 4 is the size of the slider 112 that is larger than the size of the slot 1264 of the rail 126. Thus, when a transverse force 906 is applied on the slider 112 and tends to pull the slider 112 out of the rail 126 through the slot 1264, the slider 112 does not pass through the slot 112 and does not exit the rail 126.

However, according to another embodiment, the rail 126 is configured to withstand a transverse force 904 and/or 906 and prevents exit of the slider 112 through the slot 1264 up to a certain threshold level, and when the level of the transverse force 904 and/or 906 is higher than the threshold level, the rail 126 is configured to become flexible and allows widening of the slot 1264 in an manner that allows the slider 112 to exit through the slot 1264. This embodiment allows, for example, disconnection of the cover sheet 110-X from the rafter 120 by pulling the cover sheet 110-X and thereby applying a transverse force 904 and/or 906 on the slider 112 that is higher than the threshold level that the rail is configured to withstand.

Still another embodiment that is illustrated in FIG. 4 is the connection of the slider 112 to the cover sheet. According to exemplary embodiment illustrated in FIG. 4, the slider 112 is connected to strip 114, when the strip 114 is connected to the cover sheet (the cover sheet is not shown in FIG. 4), as illustrated in FIG. 3. As can be seen in FIG. 4, the strip 114 is attached to the slider 112 and passes through the slot 1264 of the rail 126. The strip 114 can be attached to the slider 112 by, for example, an adhering material, mechanical clamping, and the like.

Figure 5:
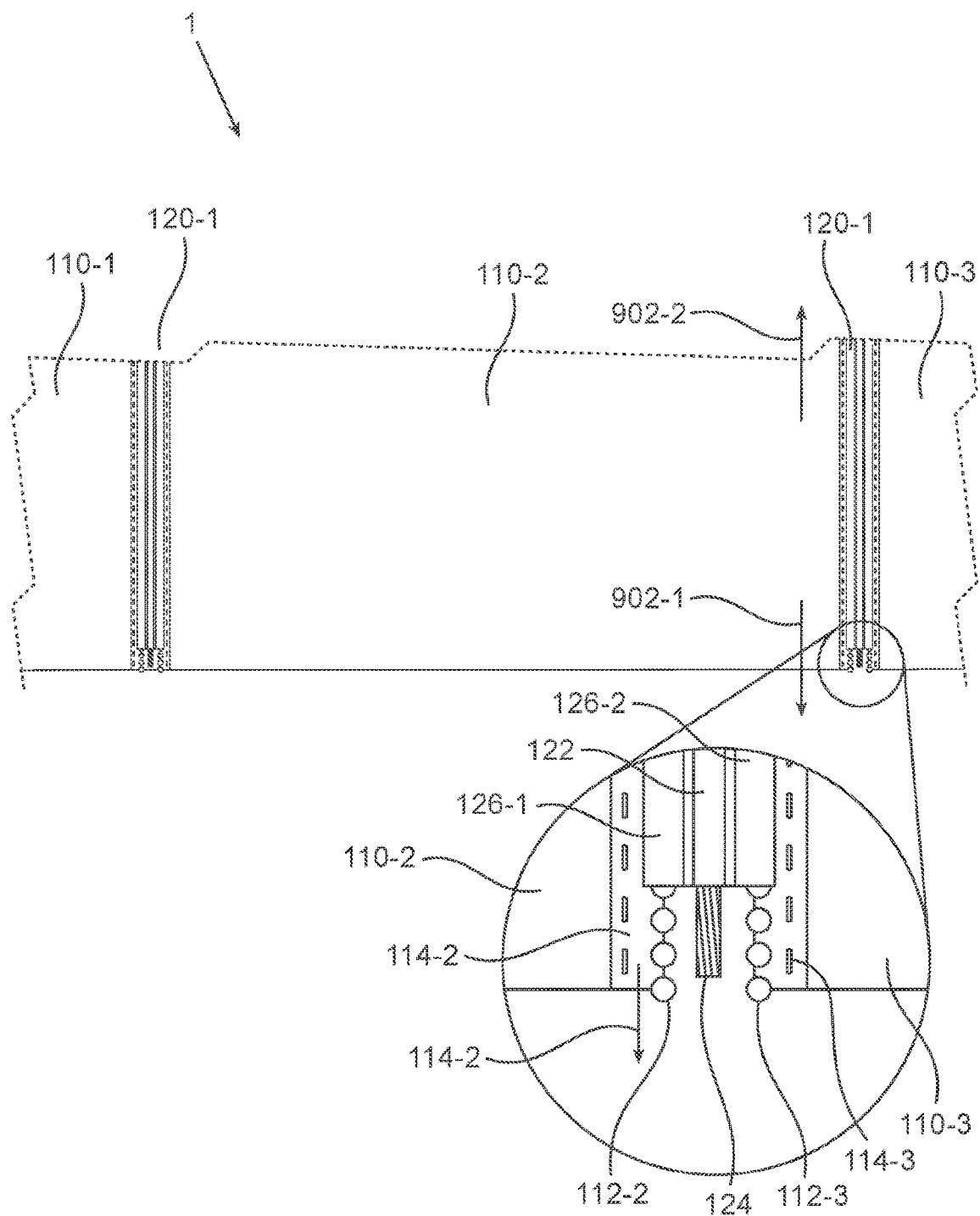
FIG. 5 schematically illustrates according to an exemplary embodiment, a cover system comprising three cover sheets connected through two rafters.

Referring now to FIG. 5, schematically illustrating, according to an exemplary embodiment, a cover system comprising three cover sheets connected through two rafters. FIG. 5 illustrates a first cover sheet 110-1 connected to a first rafter 120-1; a second cover sheet 110-2 connected in one side to the first rafter 120-1, while in an opposite side, the second cover sheet 110-2 is connected to a second rafter 120-2; and a third cover sheet 110-3 also connected to the second rafter 120-2, according to embodiments described above. Thus, the three cover sheets 110-X that are connected by the two rafters 120-X together form a cover system 1 that is configured to cover an open space, crops, or items, as described herein before.

FIG. 5 also illustrates an enlarged view of a part at an edge of the second rafter 120-2 and parts of the second cover sheet 110-2 and third cover sheet 110-3 that are connected to the second rafter 120-2, according to some exemplary embodiments. The enlarged view illustrates the tube 122, a cable 124 inside the tube 122 that also protrudes out of the tube 122, a first rail 126-1 attached to one side of the tube 122, and a second rail 126-2 attached to another side of the tube 122. In the first rail 126-1 there is a plurality of second sliders 112-2 attached to the second cover sheet 110-2 through a second strip 114-2. Similarly, in the second rail 126-2 there is a plurality of third sliders 112-3 attached to the third cover sheet 110-3 through a third strip 114-3.

Also illustrated in FIG. 5 are two opposite longitudinal forces 902-1 and 902-2 that can be applied on the cover sheets 110-2. When, for example, a first longitudinal force 902-1 is applied on the second cover sheet 110-2, the second cover sheet 110-2 can be pulled in the same direction of the puling force so that the cover sheet 110-2 can wind around the roller 130.

One of the advantages of the cover system 1 of the present subject matter is the flexibility of the cover sheets 110-X and the flexibility of the rafters 120-X. For example, the cover sheets 110-X and rafters 120-X can be shipped in spools. This is advantageous particularly due to the large number of components, as well as their large sizes, that occasionally have to be shipped. Another advantage is the easy installation and handling of the cover system 1.

Returning now to FIG. 1, illustrating an exemplary embodiment of the cover system 1. The cover system 1 comprises a first rafter 120-1, a second rafter 120-2, a third rafter 120-3 and a fourth rafter 120-4. The first rafter 120-1 is stretched over a first raw of supports, in a form of poles designated 140-1; the second rafter 120-2 is stretched over a second raw of supports 140-2; the third rafter 140-3 is stretched over a third war of supports 140-2; and the fourth rafter 140-4 is stretched over a fourth raw of supports 140-4.

The first rafter 120-1 is connected to one cover sheet 110-1, and the fourth rafter 120-4 is connected to one cover sheet 110-4. On the other hand, the second rafter 120-2 is connected to two cover sheets 110-1 and 110-2, and the third rafter 120-3 is also connected to two cover sheets 110-2 and 110-3. Thus, according to one embodiment, the rafter 120-4, as an example, can comprise one rail on an appropriate side, and as a result, rafter 120-4 is configured to connect to one cover sheet 110-3. According to another embodiment, the rafter 120-3, as an example, can comprise two rails, each on one side of the rafter, and as a result, rafter 120 is configured to be connected between two cover sheets 110-3 and 110-2.

According to one embodiment, the degree of retraction of one cover sheet is independent of the degree of retraction of other cover sheets of the cover system. For example, referring now to FIG. 1, the first cover sheet 110-1 can be fully retracted, while the second cover sheet 110-2 and the third cover sheet 110-3 are fully extended. Another example is that the first cover sheet 110-1 and the second cover sheet 110-2 can be partially extended, while the third cover sheet 110-3 is fully retracted. This is to illustrate the flexibility of usage of the cover system 1 of the present subject matter.

According to one embodiment, the direction of movement of one cover sheet along the rafter or rafters, to which the cover sheet is connected, is independent of the direction of movement of other cover sheets of the cover system, along the rafters, to which the other cover sheets are connected. The directions of movements of the cover sheets and rafters are illustrated in FIG. 1 with double-headed arrows 902-X. Each cover sheet 110-X can move in directions 902 independently of the other cover sheets.

Figure 6:
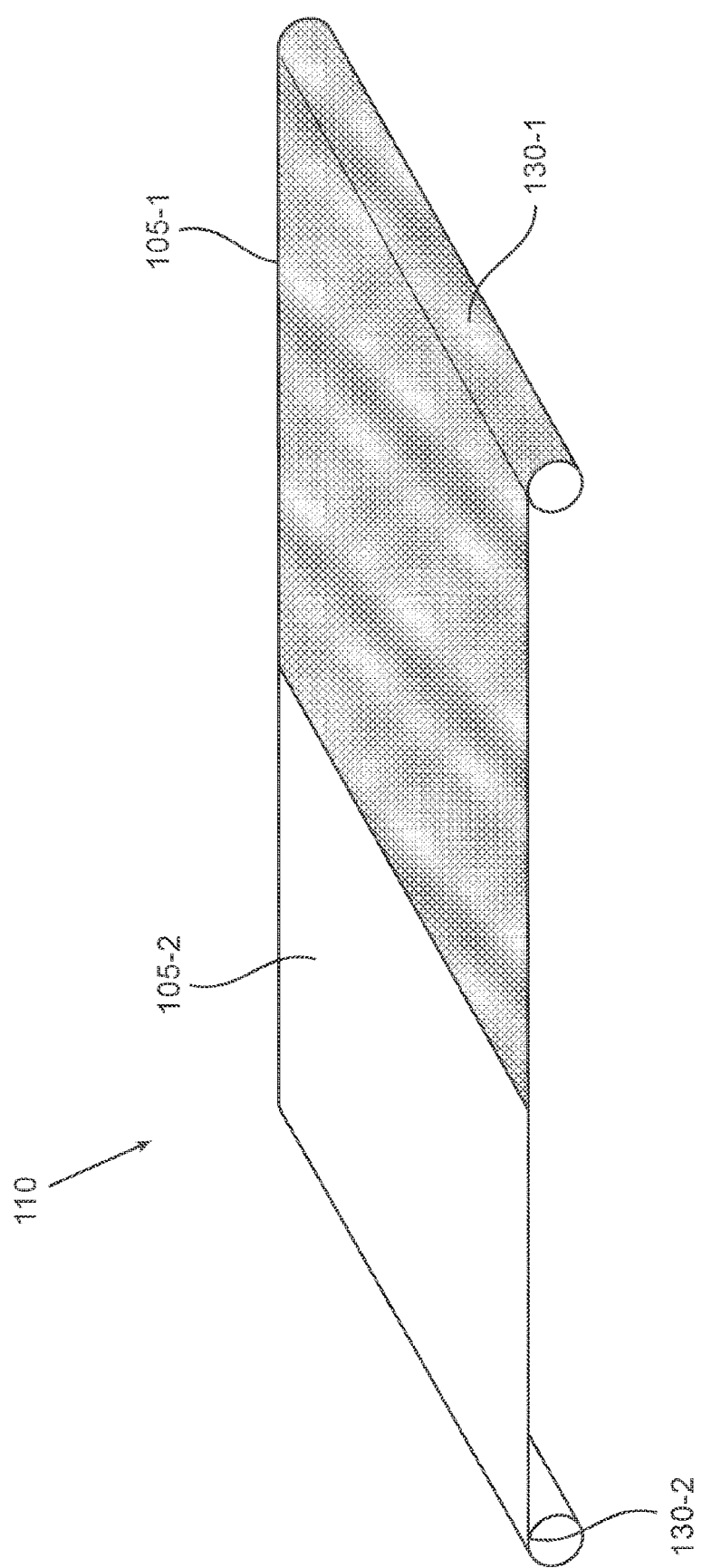
FIG. 6 schematically illustrates, according to an exemplary embodiment, a cover sheet comprising a plurality of different parts.

Referring now to FIG. 6, schematically illustrating, according to an exemplary embodiment, a cover sheet comprising a plurality of different parts. In the aforementioned embodiments, the cover sheet 110 was regarded as uniform in its entirety, for example in terms of transparency. However, according to another embodiment, the cover sheet 110 can comprise a plurality of sub-cover sheets 105-X that are attached one to the other along the length of the cover sheet 110. According to yet another embodiment, the sub-cover sheets 105-X are different in their transparency. For example, FIG. 6 illustrates two sub-cover sheets of the cover sheet 110—a first sub-cover sheet 105-1 and a second sub-cover sheet 105-2. As will be understood hereinafter, this cover sheet 110 can comprise additional sub-cover sheets 105-X that are not seen in FIG. 6. For example, the first sub-cover sheet 105-1 can be opaque and prevents passage of light through it, and the second sub-cover sheet 105-2 can be transparent and allows passage of light through the second sub-cover sheet 105-2.

In addition, FIG. 6 illustrates a first roller 130-1 attached to one side of the cover sheet 110, and a second roller 130-2 attached to an opposite side of the cover sheet 110. Simultaneous rolling of the first roller 130-1 and the second roller 130-2, in the same direction and velocity causes changing of the sub-cover sheet 105 that is practically used for covering. Thus, the exemplary cover sheet 110 that is illustrated in FIG. 6 can comprise additional sub-cover sheets 105 that are wrapped around the rollers 130-X. For example, as illustrated in FIG. 6, the first sub-cover sheet 105-1 that is opaque is practically used for covering. When there is a desire to allow light to pass through the cover sheet 110, the first roller 130-1 and the second roller 130-2 can simultaneously roll clockwise in the same speed. As a result, the first sub-cover sheet 105-1 is wrapped around the first roller 130-1, and the second sub-cover sheet 105-2, that is transparent, is released from the second roller 130-2 and practically used for covering, thus allowing passage of light through the cover sheet 110.

It should be mentioned that the embodiments illustrated in FIG. 6 are possible due to the structure of the cover system 1 of the present subject matter, namely the rafters 120-X and the embodiments of connection of the cover sheet 110 with the rafter enables the aforementioned ability to change the type of sub-cover sheet 105-X that is practically used for covering.

According to one embodiment, the roller 130 is manually operated. According to another embodiment, the roller 130 is operated by a rotor.

It is appreciated that certain features of the subject matter, which are, for clarity, described in the context of separate embodiments, may also be provided in combination in a single embodiment. Conversely, various features of the subject matter, which are, for brevity, described in the context of a single embodiment, may also be provided separately or in any suitable sub combination.

Although the subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A cover system comprising:
   at least one cover sheet having four edges;
   a plurality of flexible rafters, each of the rafters being slidably connected to at least one of two opposite edges of the four edges; and
   at least one roller provided on at least one of two other opposite edges of the four edges, wherein the at least one roller is configured to rotate, and each one of the at least one cover sheet is configured to wrap around the roller and be released from the roller, depending on a direction of rotation of the roller,
   wherein the plurality of flexible rafters are configured to be wound with the at least one cover sheet into a compact structure.

2. The cover system of claim 1, wherein the at least one cover sheet has a rectangular shape.

3. The cover system of claim 1, wherein each of the rafters is slidably connected to at least one of two opposite longitudinal edges, and wherein the at least one roller is provided on at least one of two transverse edges.

4. The cover system of claim 1, further comprising at least one support configured to support each of the plurality of rafters.

5. The cover system of claim 4, wherein the at least one support is in a form of a pole that is configured to hold the plurality of flexible rafters above a surface of an open space.

6. The cover system of claim 4, wherein the at least one support is a part of a structure that is covered by the cover system.

7. The cover system of claim 6, wherein the structure is a greenhouse.

8. The cover system of claim 1, wherein each of the plurality of rafters comprises:
   a tube;
   a cable threaded within the tube and extending out of the tube; and
   one or two rails flexibly attached to the tube,
   wherein each of the rails is configured to hold at least one of the at least one cover sheet and allow sliding of the at least one of the at least one cover sheet along the length of the rail.

9. The cover system of claim 8, wherein the plurality of rafters further comprises one or two connectors, each connector being configured to connect each of the one or two rails to the tube.

10. The cover system of claim 9, wherein the connector allows bending of the rail relative to the tube.

11. The cover system of claim 8, wherein the one or two rails comprise a hollow along an entire length of the rail and a slot along an entire length of the rail, wherein the slot is positioned distally from the tube to which the rail is attached.

12. The cover system of claim 11, wherein the rail has a round profile, and the slot has a substantially C-shaped profile.

13. The cover system of claim 11, wherein a plurality of sliders is attached to at least one of two opposite edges of the four edges of the at least one cover sheet, wherein one of the plurality of sliders is configured to be threaded in the hollow of the rail, and slide along the rail, wherein the at least one cover sheet passes through the slot.

14. The cover system of claim 13, wherein the plurality of sliders is attached to a longitudinal edge of a strip and wherein an opposite longitudinal side of the strip is attached to the at least one of two opposite edges of the four edges of the at least one cover sheet.

15. The cover system of claim 13, wherein a friction between a surface of one of the plurality of sliders and an inner surface of the one or two rails, facing the hollow, allows smooth sliding of the one of the plurality of sliders along the rail.

16. The cover system of claim 13, wherein a size of the one of the plurality of sliders is larger than a size of the slot, wherein the one of the plurality of sliders is confined within the hollow, and is configured to slide inside the hollow without being able to pass through the slot and disconnect from the rail.

17. The cover system of claim 13, wherein the rail is configured to withstand a transverse force applied on the sliders that are within the hollow, and not bend in a manner that widens the slot and allows the sliders to be pulled out of the rail through the slot.

18. The cover system of claim 13, wherein each of the one or two rails is configured to withstand a transverse force and prevent exit of the slider through the slot up to a certain threshold level, and when the level of the transverse force is higher than the threshold level, the rail is configured to become flexible and allow widening of the slot in a manner that allows exit of the slider through the slot.

19. The cover system of claim 1, wherein the at least one cover sheet comprises a plurality of sub-cover sheets that are attached one to the other along a length of the at least one cover sheet.

20. The cover system of claim 19, wherein the sub-cover sheets are different in their transparency.

21. The cover system of claim 19, wherein a first roller is attached to one side of the at least one cover sheet, and a second roller is attached to an opposite side of the at least one cover sheet, wherein simultaneous rolling of the first roller and the second roller, in the same direction and velocity, causes changes of the positioning of the sub-cover sheets.

* * * * *